United States Patent [19]

Hurtado et al.

[11] Patent Number: 5,183,966
[45] Date of Patent: Feb. 2, 1993

[54] TERMINATION ASSEMBLY WITH IMPROVED WATERBLOCK

[75] Inventors: Larry Hurtado, League City; Rick A. Curto; Dallas Martin, both of Friendswood, all of Tex.

[73] Assignee: Western Atlas International, Inc., Houston, Tex.

[21] Appl. No.: 615,237

[22] Filed: Nov. 19, 1990

[51] Int. Cl.⁵ .......................................... H02G 15/22
[52] U.S. Cl. ...................................... 474/20; 174/19; 174/76; 174/77 R; 181/110; 181/118; 367/15; 367/130
[58] Field of Search ................... 174/20, 19, 76, 77 R; 367/15, 130; 181/110, 118

[56] References Cited

U.S. PATENT DOCUMENTS

| | | | |
|---|---|---|---|
| 2,043,341 | 6/1936 | Turechek | 174/75 R |
| 3,739,073 | 6/1973 | Schneider et al. | 174/20 |
| 3,816,641 | 6/1974 | Iversen | 174/76 |
| 3,852,512 | 12/1974 | Herrmann, Jr. | 174/19 |
| 4,015,329 | 4/1977 | Hutchison | 174/76 X |
| 4,053,704 | 10/1977 | Smith | 174/76 X |
| 4,450,318 | 5/1984 | Scardina et al. | 174/84 R |
| 4,621,168 | 11/1986 | Bryant et al. | 174/76 X |
| 4,715,023 | 12/1987 | Otto | 367/144 X |
| 4,870,626 | 9/1989 | Tveit | 367/130 |

FOREIGN PATENT DOCUMENTS

| | | | |
|---|---|---|---|
| 723165 | 2/1955 | United Kingdom | 174/76 |
| 776890 | 6/1957 | United Kingdom | 174/76 |

Primary Examiner—Morris H. Nimmo
Attorney, Agent, or Firm—Western Atlas International, Inc.

[57] ABSTRACT

A termination assembly is disclosed providing a substantially watertight, yet field serviceable interface to a plurality of electrical splices. The termination assembly includes a housing having an anchor portion for receiving and fixing a multi-transmission line cable therein, a ported sleeve for cradling the transmission lines, and a shell for providing field access to the splices between the transmission line in the interior of the housing. A resinous epoxy, together with O-ring seals and heat shrink tubing provide redundant protection against the invasion of water into the housing along the transmission lines.

15 Claims, 2 Drawing Sheets

TERMINATION ASSEMBLY WITH IMPROVED WATERBLOCK

BACKGROUND OF THE INVENTION

1. Field of the Invention

This invention relates generally to the field of cable terminations and more particularly to a waterproof termination assembly. This invention relates more particularly to a field serviceable termination assembly subject to extremely high tensile stress. This invention relates even more particularly to a termination assembly having an improved water-blocking system.

2. Discussion of the Related Art

In towing electrical equipment beneath the water surface, invasion of water into the electrical circuitry is often of concern. This is particularly true after a repair has been made to an otherwise water-tight circuit. This invention is a method and apparatus for making a watertight connection of electrical transmission lines and for providing easy access to repair such connections if necessary.

In the field of marine seismic exploration, an acoustic signal is generated in the water by a source. Traditionally the acoustic signal was generated by explosives, but due to environmental concerns and safety, other sources such as air guns are used. The advantage of using air guns is the ability to adjust the signature of the acoustic source by changing the volume of air explosively released into the surrounding water.

To actuate an air gun, a chamber is pressurized with a volume of air to a desired pressure. A solenoid in the air gun reduces the pressure in a counteracting chamber which allows the pressurized air to open a valve and escape into the water to create the acoustic pulse. The solenoid is electrically actuated and is coupled to a control device aboard the vessel through the cable.

It is common that more than one air gun is used forming an air gun array with as many as sixteen air guns employed in a single array. If one gun in the array fails, the acoustic signature also changes. This requires that the gun array or "string" be brought aboard the vessel to replace the malfunctioning air gun. This increases time to conduct the survey which is directly correlates to increased costs.

One of the primary factors contributing to downtime is the invasion of water into the electrical connections in the cable. Because of the nature of the cable construction and cable insulators, water may "wick" along the conductor or transmission line and reach an electrical connection, causing corrosion and shorting of the connection. Water often invades as a result of a breach in the cable skin. At other times, water gains entry through other connectors in the line. As a result, it is not unusual that the cable head connections between the cable and the submersible device (air gun array) to be replaced at periodic intervals. This again results in increased costs due to the down time needed to make the replacement.

There has been a long felt, yet unsolved need for a termination assembly for making submersible electrical connections which prevents water from reaching electrical connections. Similarly, there has been such a need for a termination assembly which allows for repairs in the field, yet maintains its water-tight integrity after such repair. It is a purpose of the above invention to provide such a termination assembly which satisfies such a need. It is a further purpose of this invention to provide a termination assembly which blocks the migration of fluids along each conductor.

SUMMARY OF THE INVENTION

It is an object of the instant invention to provide a new termination assembly for a cable used to tow submersible apparatus where the cable contains a plurality of transmission lines.

It is yet another object of this invention to provide a termination assembly for a towing cable having a watertight construction to prevent the invasion water therein which disrupts operation.

It is yet another object of the instant invention to provide a water-tight termination assembly which is field repairable and retains its water-tight integrity after such repairs.

A further object of this invention is to provide a method for forming a substantially impenetrable waterblocked splice between at least two electrical transmission lines within the termination assembly.

In accomplishing each of the above objects, the invention comprises a pot for receiving an end of a towing cable. The end of the cable is anchored within the pot by fixing the cable stress members in an epoxy plug. Attached to the pot is an accessible sleeve forming a compartment which is substantially impenetrable by fluids and houses a plurality of transmission lines extending from the cable and spliced with other cables extending from the end of the sleeve. The sleeve provides a means for accessing the spliced transmission lines and effecting a repair or change in the coupling arrangement if necessary. Each of the transmission lines extending from the cable into the chamber has a series of cascaded O-ring seals strategically placed thereon which are encased by the epoxy. Each splice also contains a water block including another cascaded set of O-ring seals enclosed by a constrictive tubing. The series of O-ring seals, epoxy, and constrictive tubing provide a substantially impenetrable barrier against the invasion of water into the splices.

BRIEF DESCRIPTION OF THE DRAWING FIGURES

A better understanding of the benefits and advantages of my invention may be obtained by referring to the appended detailed description and drawing figures where like elements are designated with like reference numerals, wherein.

DETAILED DESCRIPTION OF ONE EMBODIMENT OF THE INVENTION

Figure 1:
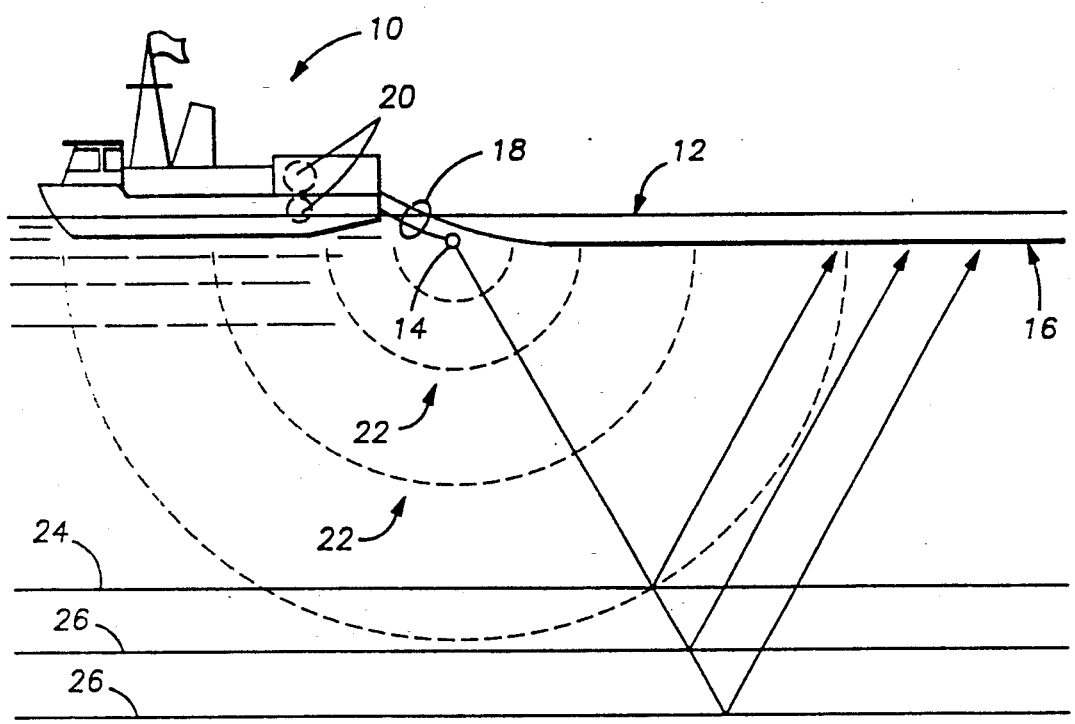
FIG. 1 is a side elevation view of a vessel conducting a seismic survey in a body of water.

FIG. 1 is a side elevation view of a vessel 10 conducting a seismic survey in a body of water 12. Extending behind the vessel is at least one acoustic energy source 14 and at least one seismic streamer cable 16. The acoustic source and the streamer cable are attached to the vessel by way of "lead-in" cable sections generally indicated as 18 and stored on reels 20 aboard the vessel. Typically the vessel steams along at a speed between 3 and 6 knots, towing the acoustic source and streamer cable through the water at a predetermined depth. At intervals, the acoustic source 14 is activated, generating an acoustic pulse which is represented by the expanding wave front 22. The wave front 22 propagates downward through the water and is reflected and refracted by the water bottom 24 and subsurface zones 26 having contrasting acoustic impedance. The acoustic signals reflected back to the surface may be detected by sensors disposed along the length of the streamer cable. The sensors receiving the acoustic signals in turn generate a signal which is transmitted along transmission lines (electrical or optical) back to the vessel where they are received by recording and processing equipment (not shown).

Because of the different functions served by the acoustic source 14 and the streamer cable 16, the lead-in cable sections for each are physically different as well. Although both of the lead-in cables typically have a tough outer skin enclosing a stress member and a plurality of conductors, the lead-in section for the acoustic source array may also contain at least one air line for providing high-pressure air to the source array. This is because the acoustic signal is generated by the explosive release of compressed air from acoustic generators or air guns shown as 28 in FIG. 2 and are well known in the art.

Figure 2:
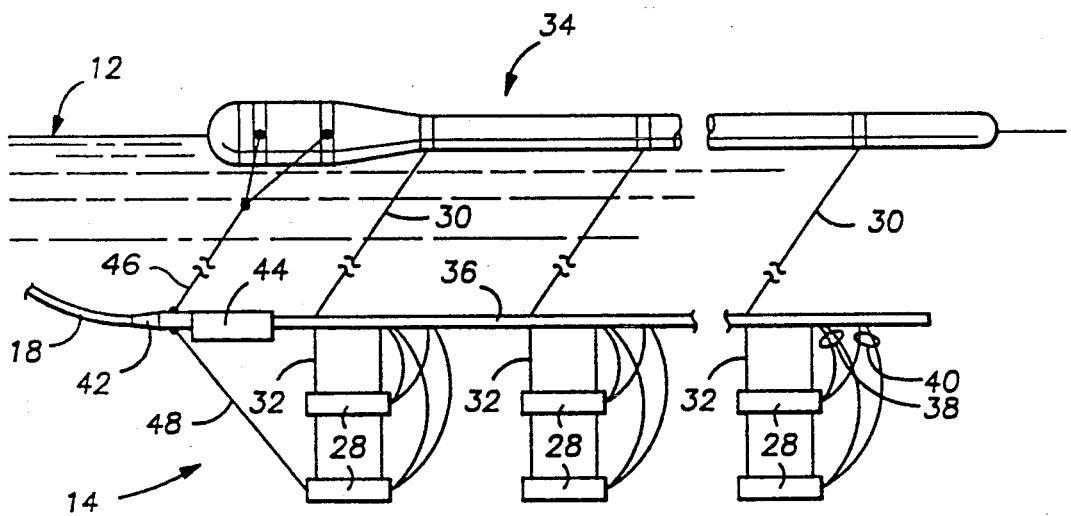
FIG. 2 is a side elevation view of an acoustic-source array such as the one shown in FIG. 1.

FIG. 2 is a side elevation of an acoustic-source array 14 such as the one shown in FIG. 1. The array 14 typically consists of a plurality of acoustic generators or air guns 28 suspended below the water surface 12 at a predetermined depth. The air guns are supported in the water by cables 30 and/or chains 32 attached to a buoy or floatation system 34. Each of the air guns 28 in the array is interconnected to the lead-in cable 18 by an umbilical 36. The umbilical provides both electrical lines and air lines the length of the array 14. Each of the air guns is connected to the umbilical by appropriate electrical and air lines 38 and 40.

At the end of the lead-in cable 18, and at the beginning of the air gun array 14, is a cable head 42. The cable head is anchored to the end of the lead-in cable in a manner to be described below. Adjacent the end of the cable head 42 is a cradle 44 for receiving a plurality of lines (not shown) extending from the umbilical. The cradle 44 is generally made from a compliant sheet material to keep the lines and associated connectors interconnecting the cable head and the umbilical together. Interconnecting the cable head 42 and the float 34 is a cable 46. Similarly, the cable head 42 and the first air gun 15 is interconnected by a chain 48. The chain 48 maintains the relative position of the air guns while the array is under tow. The cable 46 and chain 48 also serve to transfer much of the towing stress associated therewith to the lead-in cable.

Figure 3:
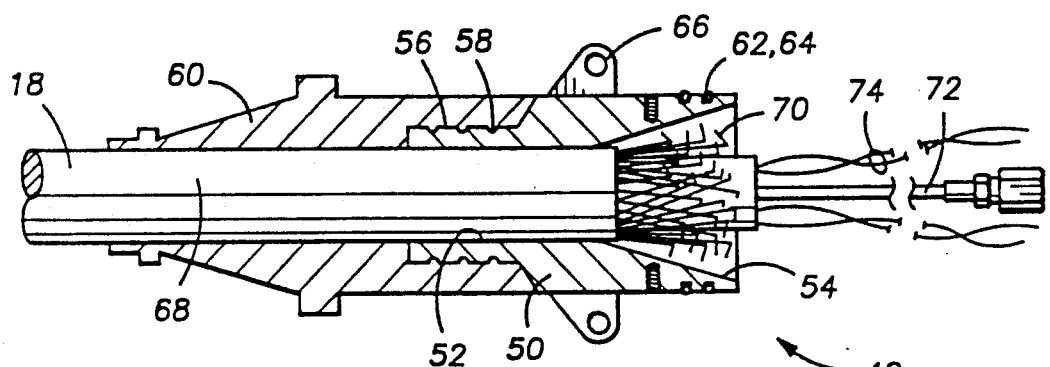
FIGS. 3–4 are cross-sectional views of a cable termination assembly which may be used with the acoustic-source array shown in FIG. 2.

Refer now to FIG. 3 which illustrates a cross-sectional side view of one embodiment of a termination assembly or cable head 42 which may be used with the acoustic-source array 14 shown in FIG. 2. Although the following description is made with reference to the termination assembly used with the acoustic array, such should not be considered a limitation as to its application. Substantially similar terminations may be used in other applications requiring a water-tight configuration.

The foundation of the termination assembly 42 is an armored pot 50. The pot may be made of steel or other high strength and durable material. The pot may have an axial bore 52 extending therethrough and having an inwardly tapered portion 54 entering from a second end to about the middle of the pot. The first end of the pot may have a reduced outer diameter portion forming a nipple 56 with several concentric grooves or corrugations 58 formed therein. The grooves function as an anchor for a bending restraint 60 received about the nipple 56 and a portion of the lead-in cable 18. The bending restraint may be molded about the cable and nipple and prevents the lead-in cable from crimping at the armored pot. With respect to the opposite end of the pot, the outer surface of the second end contains at least one concentric groove 62 designed to receive an O-ring 64. It is preferred that the O-rings have a durometer hardness of about 70 although other hardness values may also be found to be suitable. Located midway about the exterior of the pot may be a plurality of towing eyes 66 for coupling the lead cable 44 and chain 46 described above.

As shown in FIG. 3, the end of the lead-in cable 18 enters the first end of the armored pot 50 and partially extends from the second end. A protective outer sheath 68 of the lead-in cable has been stripped away, exposing the stress member or members 70 and the transmission lines 72 and 74. It is preferred that the stress members are unraveled or separated and folded backward along the length of the cable so as to fill the tapered bore 54 and may even extend into bore 52. The air line 72 and electrical lines 74 may continue to extend beyond the second end of the armored pot 50.

Figure 4:
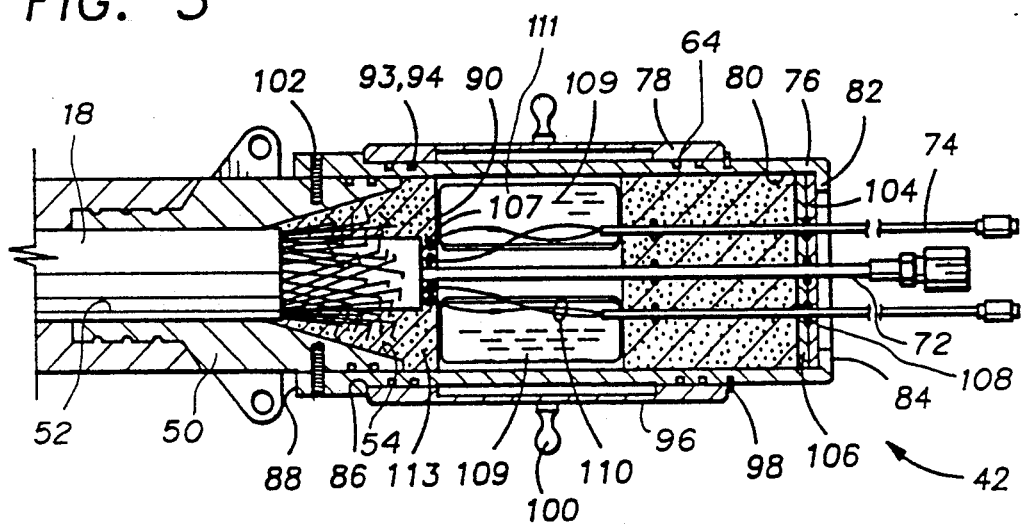

As shown in FIG. 4, a sleeve assembly 76, 78 is received about the second end of the armored pot 50. The inner sleeve 76 may be described as a right circular cylinder open at each end and having an inner wall 80 of substantially constant diameter with an inwardly extending lip 82 formed at one end 84. The outer diameter of the inner sleeve 76 may also be substantially constant along its length; the exception possibly being a slightly enlarged lip or stop 86 proximate the opposite end 88. Midway along the length of the inner sleeve 76, the wall may be breached forming at least one port or window 90 extending therethrough. In a preferred embodiment three such windows pass through the wall of the inner sleeve. Formed on each side of the windows in the outer wall of the sleeve and concentric therewith is at least one groove 93 for receiving an O-ring 94 having a durometer hardness of 70 although other seals may be found to work as well.

The outer sleeve 78 may also be a right circular cylinder. The middle portion of the inner wall 96 having a slightly greater diameter than at each end. This is preferred so that the outer sleeve will slide along the inner sleeve within a close tolerance and form a tight seal with the O-rings 94. The outer sleeve may be held in position by the stop 86 and by a snap ring 98 retained in a slot in the outer wall of the inner sleeve outboard the O-ring 94. It is preferred that the outer sleeve have a rather pronounced annulus 100 so that the outer sleeve may be easily removed from about the inner sleeve after the snap ring 98 is removed.

As shown in FIG. 4, one end 88 of the inner sleeve 76 is received about the second end of the armored pot 50, sealing with the O-rings 64. The inner sleeve may be fixed to the armored pot 50 by bolts 102. The transmission lines 72 and 74 extending from the lead-in cable also extend through the inner sleeve and out its second end. To keep the various transmission lines separate from each other, a manifold plate or disc 104, having a diameter substantially equal to that of the inner plate, is disposed in the sleeve 76 and urged against lip 82. The manifold plate has a plurality of holes, each for receiving one of a plurality of "pigtails" coupled to the transmission lines extending from the end of the lead-in cable. A second plate or disc 106 may be adjacent the first to sandwich O-rings 108 concentrically received along each transmission line such as 72 and 74. Similar O-ring seals 108 may be located along each transmission line for reasons which will be apparent below.

To secure the lead-in cable 18 in the armored pot as well as the transmission lines 72 and 74 within the inner sleeve, it is preferred that an epoxy resin 113 be used. After the armored pot has been assembled and the inner sleeve has been attached, the epoxy resin is poured about the stress members 70 and lead-in cable 18 within the tapered portion 54 of the bore 52. The epoxy resin may fill the armored pot up to the edge of the windows in the inner sleeve and surround each of the transmission lines and their accompanying O-ring seals 107. Similarly, epoxy resin fills the second end of the inner sleeve and surrounds the plurality of pigtail transmission lines and fills between the manifold plates 104 and 106. Again the level of epoxy fill is limited to the edge of the windows 90. Defined between the epoxy plugs is a chamber 111 immediately adjacent the windows which is subsequently filled with an inert cable oil 109.

Figure 5:
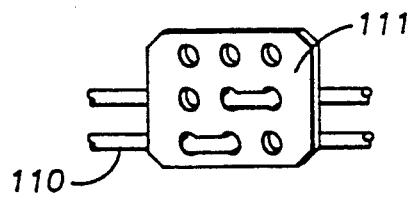
FIG. 5 shows a pair of transmission lines woven through an anchor.

In the market place, a variety of insulated coatings are used by the many manufacturers of insulated wire, some of which do not bond with epoxy resins. One such insulation material is polytetrafluoroethylene or PTFE, which is sold under a variety of trademarks, such as Teflon. The Teflon insulator is chemically resistant, is a good dielectric, and is resistant to chaffing. Such coatings also do not bond well with epoxy resins. The unwillingness of such a coating to bond with the resin reduces the effectiveness of the epoxy as an anchor and provides a pathway for moisture to migrate into sensitive electronic circuitry or couplings. It is contemplated by the instant invention that additional anchors may be employed with transmission lines coated with Teflon materials to secure them in the epoxy resin. Refer to FIG. 5 where one such anchor 111 may be a plastic or metallic plate or disc containing a plurality of holes extending through the shortest dimension. Each of the transmission lines 110 may then be woven through at least two holes in a plate. The anchor plates are located along the transmission lines such that they are immersed in the epoxy resin which then serve to relieve the tensile stress experienced by the lines 110.

Figure 6:
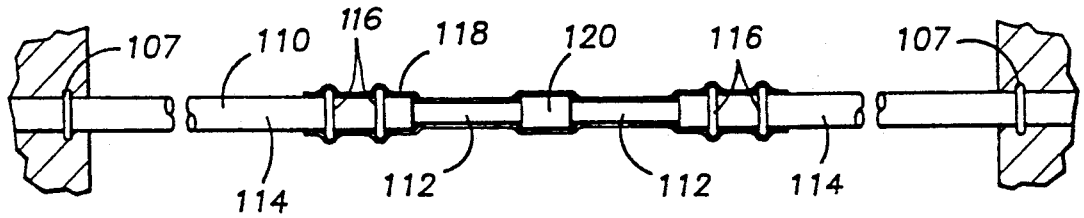
FIG. 6 is a general illustration of one embodiment of a water block contemplated by the instant invention.

FIG. 6 is a general illustration of one embodiment of a water block contemplated by the instant invention. Although not shown in the above Figures, one hundred or more transmission lines 110 may extend from the end of the lead-in cable. Each of these lines may be spliced to corresponding lines such as in transmission line 74.

Illustrated in FIG. 6 is a single conductor 110 extending from the lead-in cable 18. The conductor may consist of a central solid or twisted wire 112 surrounded by an insulator 114. For the purposes of this discussion, assume that the wire is 14 U.S. gauge solid wire. To effect a watertight splice between two similar conductors, a portion of the insulator 114 is removed from the end of each to expose the wire 112. It is preferred that two O-rings such as 116 be placed over the insulation of each wire and spaced 1 to 2 millimeters from each other near the end of the insulation. The O-rings should be of appropriate size so as to tightly fit about the outer insulation 114. Additionally, a length of constrictive tubing 118 such as heat-shrink tubing or rubber sleeve tubing, sufficient to enclose both sets of O-rings 116 is placed over one of the conductors 110. The two wires are spliced together using a conventional crimp-type splice 120. The tubing 118 is then slid over the splice and the O-rings 116 to seal about the O-rings, spice and conductors.

Figure 7:
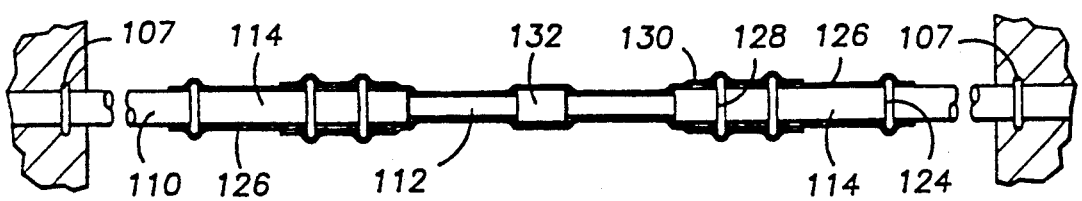
FIG. 7 is an illustration of another embodiment of a water block contemplated to be used in the instant invention.

FIG. 7 is an illustration of another embodiment of the instant invention where the water blocks are nested. Transmission lines 110 have their insulation 114 removed as above. On one transmission line at least one O-ring seal 124 is placed over the insulation a distance from the end of the exposed conductor. Constrictive tubing 126 is placed over the insulation and the O-rings and placed tightly thereabout. This same process may be repeated on the opposing conductor. After the tubing 126 is in place, a second set of O-ring seals 128 are placed 1 to 2 millimeters apart near the end of the insulation and over one end of the previously placed tubing 126. As above, one of the conductor receives a second length of tubing 130 and the conductors are crimped together at point 132. The tubing 130 previously received by one of the conductors is slid back over the crimp 132, O-ring seals 128 and fitted in place. The compressive force about the conductors produced by the O-ring seals, accompanied by the compressive force of the tubing over the O-rings, reduces and substantially blocks the invasion of any moisture into the splice. Taken in combination with the water blocks enclosed with the epoxy resin forms a substantially watertight enclosure, preventing the fluid from invading the circuitry or couplings.

In operation, the above termination may be originally manufactured at a facility where it may be readily assembled using the appropriate machinery and tools. An oil may be added to the chamber if necessary and is deployed in a normal manner. If for some reason, leakage is being experienced along one of the transmission lines the termination assembly may be retrieved and an operator may determine which of the transmission lines is affected.

It is not unusual that more than enough transmission lines are provided within the cable than are used so that the operator may disconnect the defective transmission line and reconnect to another. To gain access to the splices, the snap ring 98 is removed from inner sleeve and the outer sleeve is removed with the aid of the annulus. If the chamber is filled with an oil, such is drained or collected for later use. The splices discussed above may be readily disconnected, repaired, or reconnected in the field using conventional electricians tools. Once a repair has been accomplished, the outer sleeve is repositioned and secured and oil may be added through an appropriate port (not shown) extending through the outer sleeve.

The features described above reduce downtime and thus increase operation efficiency. The instant invention provides a termination assembly which is substantially water-tight and reliable, and if necessary, readily accessible and repairable without suffering the consequences and inconveniences of returning the cable to the machine shop for repairs. Heretofore, such cable termination assemblies had a effective lifetime of only months before the cable needed to be refitted in the shop. The instant invention removes the need to ship the cable for repairs which increases its effective lifetime use.

Our invention has been described with a certain degree of specificity. Variations will occur to those skilled in the art which are within the scope and spirit of this invention which is limited only by the appended claims, wherein:

I claim as my invention:

1. An apparatus for use in seismic surveying, comprising:
   (a) a cable having a free end, a plurality of transmission lines and a stress member extending the length of the cable;
   (b) a cable head having a first and second end, and a bore extending therebetween, said free end of the cable received by the first end of the cable head with the transmission lines extending from the second end of the cable head;
   (c) potting means placed in the cable head for anchoring the stress member in the cable head;
   (d) a sleeve coupled to the second end of the cable head for enclosing the plurality of transmission lines and distributing the transmission lines extending from the second end of the sleeve, said sleeve having an accessible chamber through at least one sealable port defined therein for providing access to the transmission lines; and
   (e) means within the sleeve for preventing a fluid from entering the chamber.

2. An apparatus for use in seismic surveying, comprising:
   (a) a cable having a free end, at least one stress member and at least one transmission line;
   (b) a cable head having a first and second end interconnected by an axial bore, the free end of the cable received in the first end of the cable head with the at least one stress member firmly anchored within the cable head and the at least one transmission line extending from the second end of the cable head;
   (c) a sleeve having a first and second end, said first end of the sleeve concentrically coupled to the second end of the cable head and enclosing the at least one transmission line, the sleeve having at least one sealable port for providing access to the at least one transmission lines enclosed in the sleeve, and said second end of the sleeve having a manifold for distributing the at least one transmission line;
   (d) resin means placed within the sleeve for sealing the at least one transmission line at the cable head and at the manifold and for defining a chamber therebetweeen; and
   (e) sealing means placed along the at least one transmission line for preventing the migration of fluid along the at least one transmission line.

3. An assembly for terminating a cable having a protective jacket, a transmission line and a stress member therein, comprising:
   (a) a cable head having an axial bore for receiving said cable and for anchoring said stress member of said cable;
   (b) a sleeve having a first and a second end, said first end of the sleeve concentrically coupled to an end of the cable head opposite the end for receiving the cable, the sleeve having at least one sealable port for providing access to the transmission line within the sleeve and said second end of the sleeve having a manifold for distributing the transmission line extending from the cable;
   (c) means for sealing said transmission line at a first and second location within the sleeve, the volume within the sleeve between the first and second locations defining a chamber adjacent to said sealable port; and
   (d) means distributed along the transmission line within the chamber for preventing a fluid from migrating along the transmission line.

4. An apparatus for sealing a connection between a first and second transmission line (110), comprising:
   (a) a first (107) and second (116) seal concentrically received about a first and a second transmission line;
   (b) a potting means (113) encasing a portion of each of the first and second transmission lines (110) and the first seal (107);
   (c) means (120) for interconnecting said first and second transmission lines; and
   (d) means (118) received over the interconnecting means (120) and the second seal (116) on each said first and second transmission line for substantially sealing the interconnecting means (120) and second seal of each said first and second transmission line.

5. A method for sealing a coupling between two transmission lines having an outer insulating sheath (114) and at least one conductor (112) therein, comprising the steps of:
   (a) removing a portion of the insulating sheath of a conductor in each of two transmission lines to expose the conductors;
   (b) placing a separate first seal (107) about the insulating sheath (114) of each transmission line (112) distant from the exposed conductor, the seal (107) fitting tightly about the insulating sheath (114);
   (c) placing a separate second seal (116) about the insulating sheath of each transmission line proximate the exposed conductor (112), the seal (116) fitting tightly about the insulating sheath;
   (d) placing a length of tubing (118) about one of the transmission lines, the length thereof sufficient to extend over the second seal on each transmission line when the conductors are interconnected;
   (e) coupling the conductors (112) of the transmission lines; and
   (f) sliding the length of tubing over the connection (120) of the conductors and over the second seal proximate the connection and constricting the tubing (118) about the connection (120) and each second seal (116).

6. The apparatus as defined by claim 1, further comprising:
   means disposed along the transmission lines and within the means for preventing a fluid from entering the chamber for anchoring the transmission lines within the means for preventing a fluid from entering the chamber.

7. The apparatus as defined by claim 1, wherein the means for preventing a fluid from entering the chamber, comprises in combination:

(a) potting compound filling portions of the sleeve and surrounding portions of the transmission lines; and
(b) a first and a second water block positioned along each transmission line, at least said first water block located along a portion of the transmission lines encased by the potting compound.

8. The apparatus as defined by claim 1, wherein the means for anchoring the stress member in the cable head, comprises:
(a) the bore proximate the second end of the cable head having a tapered diameter decreasing toward the first end of the cable heads, said stress member of the cable distributed within the tapered portion of the bore; and
(b) a hardened adhesive substantially filling the bore and encasing the cable and the stress member.

9. The apparatus as defined by claim 1, wherein the sleeve, comprises:
(a) an inner sleeve having a first end coupled to the cable head, an open end opposite the first end, and at least one port defined in a wall of the inner sleeve;
(b) manifold means disposed in the open end of the inner sleeve for distributing the transmission lines therefrom; and
(c) an outer sleeve received along the inner sleeve and adapted for sealing engagement with the inner sleeve when covering said at least one port.

10. The apparatus as defined by claim 2, further comprising at least one anchor plate having the at least one transmission line threaded therethrough the encased by platehe resin means.

11. The apparatus as defined by claim 2, wherein the sealing means, comprises:
(a) a first sealing means received along each transmission line and enclosed by the resin means;
(b) a second sealing means received along each transmission line and on each side of a connection between at least two transmission lines; and
(c) a constrictive wrap enclosing the connection between the transmission lines and the second sealing means on each side of the connection.

12. The apparatus as defined by claim 2, wherein the sealing means, comprises:
(a) a first sealing means received about a first and a second transmission line distant from a connection therebetween;
(b) a first constrictive wrap received about the first and second transmission line proximate the connection and enclosing the first sealing means;
(c) a second sealing means located about the first and second transmission line and the first constrictive wrap proximate the connection between the first and second transmission line; and
(d) a second constrictive wrap received about the first and second transmission line including the connection and enclosing the second sealing means on the first and second transmission line.

13. A method for sealing two transmission lines, each having an outer insulating sheathing and at least one conductor therein, the method comprising the steps of:

(a) removing a portion of the insulating sheathing of a conductor in each of two transmission lines to expose the conductors;
(b) placing a separate set of at least two spaced apart O-rings on the insulating sheathing of each of the two transmission lines near their respective exposed conductor;
(c) placing a separate shrinkable tubing over each said set of O-rings on each of the two transmission lines and at least on a portion of their respective exposed conductor;
(d) shrinking each of the shrinkable tubing;
(e) securely coupling the exposed conductors to each other; and
(f) placing a single shrinkable tubing over the shrinkable tubings placed in step (c) and shrinking that shrinkable tubing to form a seal between the insulating sheathings of the two transmission lines.

14. A method for sealing two transmission lines, each having an outer insulating sheathing and at least one conductor therein, the method comprising the steps of:
(a) removing a portion of the insulating sheathing of a conductor in each of two transmission lines to expose the conductors;
(b) tightly placing a separate O-ring over the insulation sheathing of each of the two transmission lines at a certain distance from their respective exposed conductor;
(c) sealing each of the O-rings placed in step (b) with a resin;
(d) placing a separate set of at least two spaced apart O-rings on the insulating sheathings of each of the two transmission lines near their respective exposed conductor;
(e) securely coupling the exposed conductors to each other;
(f) placing a single shrinkable tubing over the two sets of O-rings and the transmission lines therebetween; and
(g) shrinking the shrinkable tubing placed in step (f) to form a seal between the insulating sheathings of the two transmission lines.

15. A cable assembly, comprising:
(a) a cable having a stress member and a plurality of transmission lines;
(b) a cable head having a first and second end and a bore extending therebetween, said cable placed in the cable head in a manner such that the stress member of the cable terminates near the second end of the cable head and the transmission lines extend a certain distance beyond the second end of the cable head;
(c) a sleeve having a first and second end and a bore therebetween, said first end of the sleeve sealingly placed over the second end of the cable head such that the stress member terminates inside the sleeve while the transmission lines extend beyond the second end of the sleeve, said sleeve having at least one port with a first and second side between the first and second ends of the sleeve for providing access to the transmission lines inside the sleeve;
(d) anchoring means for anchoring the stress member in the cable head; and
(e) sealing means for sealing the transmission lines on both sides of the port.

* * * * *